United States Patent
Watson et al.

(10) Patent No.: US 10,030,535 B2
(45) Date of Patent: Jul. 24, 2018

(54) COMPOSITE STRUCTURE WITH LOAD DISTRIBUTION DEVICES, AND METHOD FOR MAKING SAME

(71) Applicant: HONEYWELL INTERNATIONAL INC., Morristown, NJ (US)

(72) Inventors: Bill Russell Watson, Scottsdale, AZ (US); Michael Braley, Cincinnati, OH (US); Gary Roberts, Wadsworth, OH (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 311 days.

(21) Appl. No.: 14/802,149

(22) Filed: Jul. 17, 2015

(65) Prior Publication Data
US 2017/0016345 A1    Jan. 19, 2017

(51) Int. Cl.
| | | |
|---|---|---|
| *B21D 53/84* | (2006.01) | |
| *F01D 21/04* | (2006.01) | |
| *B29C 70/88* | (2006.01) | |
| *B29C 53/58* | (2006.01) | |
| *F01D 25/24* | (2006.01) | |
| *B23P 15/00* | (2006.01) | |
| *F01D 5/28* | (2006.01) | |

(52) U.S. Cl.
CPC .......... *F01D 21/045* (2013.01); *B21D 53/84* (2013.01); *B23P 15/00* (2013.01); *B29C 53/587* (2013.01); *B29C 70/887* (2013.01); *F01D 5/282* (2013.01); *F01D 25/24* (2013.01); *F05D 2300/603* (2013.01); *Y02T 50/672* (2013.01)

(58) Field of Classification Search
None
See application file for complete search history.

(56) References Cited

U.S. PATENT DOCUMENTS

| 5,486,086 A | * | 1/1996 | Bellia | F01D 21/045 |
| | | | | 415/9 |
| 5,605,438 A | * | 2/1997 | Burdgick | F01D 25/145 |
| | | | | 415/182.1 |
| 5,771,680 A | * | 6/1998 | Zahedi | B32B 15/14 |
| | | | | 156/196 |

(Continued)

OTHER PUBLICATIONS

"Adhesive." Merriam-Webster.com. Merriam-Webster, n.d. Web. Jul. 6, 2017 https://www.merriam-webster.com/dictionary/adhesive.*

(Continued)

*Primary Examiner* — Woody Lee, Jr.
*Assistant Examiner* — Theodore Ribadeneyra
(74) *Attorney, Agent, or Firm* — Lorenz & Kopf, LLP

(57) ABSTRACT

An improved composite structure and method for making same has been provided. The provided improved composite structure has locally strengthened areas within a reinforcement region. The locally strengthened areas within the reinforcement region have load distribution devices to redistribute load in order to (i) locally strengthen an area around damage induced by an initial momentary and direct transmitted load, and (ii) limit growth and propagation of damage induced by an initial momentary and direct transmitted load during a subsequent unbalance load. The improved composite structure reduces the impact of the fan blade out phenomenon in a weight efficient manner.

15 Claims, 2 Drawing Sheets

(56) References Cited

U.S. PATENT DOCUMENTS

| | | | |
|---|---|---|---|
| 7,479,201 B1* | 1/2009 | Wegner | B29C 53/566 156/156 |
| 2005/0252001 A1* | 11/2005 | Green | B23P 15/00 29/889.2 |
| 2006/0201135 A1* | 9/2006 | Xie | F01D 21/045 60/226.1 |
| 2012/0034076 A1* | 2/2012 | Xie | F01D 21/045 415/200 |
| 2012/0195752 A1* | 8/2012 | Lopez Partida | F01D 25/24 415/213.1 |
| 2014/0003923 A1 | 1/2014 | Finnigan et al. | |
| 2014/0072421 A1* | 3/2014 | Clarkson | F01D 21/045 415/200 |
| 2014/0113088 A1 | 4/2014 | Goering | |

OTHER PUBLICATIONS

Extended EP Search Report for Application No. 16168214.1-1703 dated May 12, 2016.

* cited by examiner

COMPOSITE STRUCTURE WITH LOAD DISTRIBUTION DEVICES, AND METHOD FOR MAKING SAME

STATEMENT REGARDING FEDERALLY SPONSORED RESEARCH OR DEVELOPMENT

This invention was made with Government support under: NNC08CA48C awarded by NASA Glenn Research Center. The Government has certain rights in the invention.

TECHNICAL FIELD

Embodiments of the subject matter described herein relate generally to composite structures and, more particularly, to an improved composite structure with load distribution devices.

BACKGROUND

A certain amount of vibration or shock occurs naturally as a dynamic loading condition in an aircraft turbine engine, and contemporary aircraft turbine engines are designed to accommodate the naturally occurring dynamic loading conditions. However, occasionally, an extreme loading condition occurs. Extreme loading conditions may induce a large impact within the aircraft turbine engine and result in a prolonged unbalanced load. An example of an extreme loading condition is a fan blade out event (wherein there is a loss of a fan blade). In the case of a fan blade out event, the segment of the turbine engine that bears the brunt of the impact is typically a composite structure referred to as the fan case.

Generally, a fan blade out event causes a heightened, momentary and direct, increase in transmitted load to the fan case, followed by an unbalanced load. The momentary and direct increase in transmitted load may cause damage, such as a crack, tear, dent, or puncture in the fan case. The resulting unbalanced load may start or exacerbate damage, for example, by inducing damage propagation within or along the fan case for the remainder of aircraft airborne time. Damage propagation, if left unchecked, could result in loss of the aircraft inlet. Therefore, a turbine engine fan case must be designed to tolerate and survive extreme loading conditions such as fan blade out events.

Currently, various methods are employed to design composite structures, such as turbine engine fan cases, that tolerate and survive fan blade out. For example, some designs reinforce a composite structure with added layers of metal or composite materials. However, as with many aspects of aircraft design, there is constant pressure to minimize weight, and the extra layers of metal or composite materials for strengthening may unacceptably increase the mass and the weight of the composite structure.

Accordingly, an improved composite structure and method for making same is desirable. The improved composite structure has an identified reinforcement region and employs locally strengthened areas therein. The locally strengthened areas within the reinforcement region have load distribution devices that redistribute load in order to (i) locally strengthen an area around damage induced by the initial momentary and direct transmitted load, and (ii) limit propagation of the damage induced by the initial momentary and direct load transmitted load during a subsequent unbalance load. The improved composite structure reduces the impact of the fan blade out phenomenon in a weight efficient manner.

BRIEF SUMMARY

This summary is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

A method of manufacturing a fan case for a turbine engine is provided. The method comprises: fabricating a cylindrical casing comprising composite fibers such that a first fiber of the composite fibers has a first fiber axis oriented tangentially around the cylindrical casing, the cylindrical casing having a forward end, an aft end, and an axis; determining an area on the cylindrical casing to be a reinforcement region; disposing a first load distribution device (LDD) that comprises composite fibers along the reinforcement region such that (i) a fiber of the composite fibers of the first LDD has a second fiber axis that is oriented to be within a range of plus or minus 30 degrees from perpendicular to the first fiber axis of the cylindrical casing, and (ii) the first LDD does not cover more than 50% of the reinforcement region; and coupling the first LDD to the cylindrical casing.

A fan case assembly is also provided. The fan case assembly comprises: a cylindrical casing comprising composite fibers such that a first fiber of the composite fibers has a first fiber axis oriented tangentially around a circumference of the cylindrical casing, the cylindrical casing having a forward end, an aft end, an axis, and a reinforcement region; and a first load distribution device (LDD) coupled to the reinforcement region, the first LDD comprising composite fibers and disposed along the reinforcement region such that (i) a fiber of the composite fibers of the first LDD has a second fiber axis that is oriented to be within a range of plus or minus 30 degrees from perpendicular to the first fiber axis of the cylindrical casing, and (ii) the first LDD does not cover more than 50% of the reinforcement region.

Also provided is a method of manufacturing a composite structure, the method comprises: fabricating a cylindrical casing comprising composite fibers such that a first fiber of the composite fibers has a first fiber axis oriented tangentially around a circumference of the cylindrical casing, the cylindrical casing having a forward end, an aft end, and an axis; determining an area on the cylindrical casing to be a reinforcement region; interleaving into the reinforcement region a first load distribution device (LDD) that comprises composite fibers such that, (i) a fiber of the composite fibers of the first LDD has a second fiber axis that is oriented to be within a range of plus or minus 30 degrees from perpendicular to the first fiber axis of the cylindrical casing, and (ii) the first LDD does not cover more than 50% of the reinforcement region; and coupling the first LDD to the cylindrical casing.

Other desirable features will become apparent from the following detailed description and the appended claims, taken in conjunction with the accompanying drawings and this background.

BRIEF DESCRIPTION OF THE DRAWINGS

A more complete understanding of the subject matter may be derived by referring to the following Detailed Description and Claims when considered in conjunction with the following figures, wherein like reference numerals refer to similar elements throughout the figures, and wherein:

DETAILED DESCRIPTION

The following Detailed Description is merely exemplary in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over any other implementations. Furthermore, there is no intention to be bound by any expressed or implied theory presented in the preceding Technical Field, Background, Brief Summary or the following Detailed Description.

The following descriptions may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. In addition, certain terminology may also be used in the following description for the purpose of reference only, and thus are not intended to be limiting.

The embodiment provided herein describes a cylindrical composite structure, however, a skilled practitioner in the art will readily appreciate that the composite structure may have any shape or form. The exemplary embodiment described herein is merely an example and serves as a guide for implementing the novel systems and method herein in any industrial, commercial, or consumer application. As such, the examples presented herein are intended as non-limiting.

Figure 1:
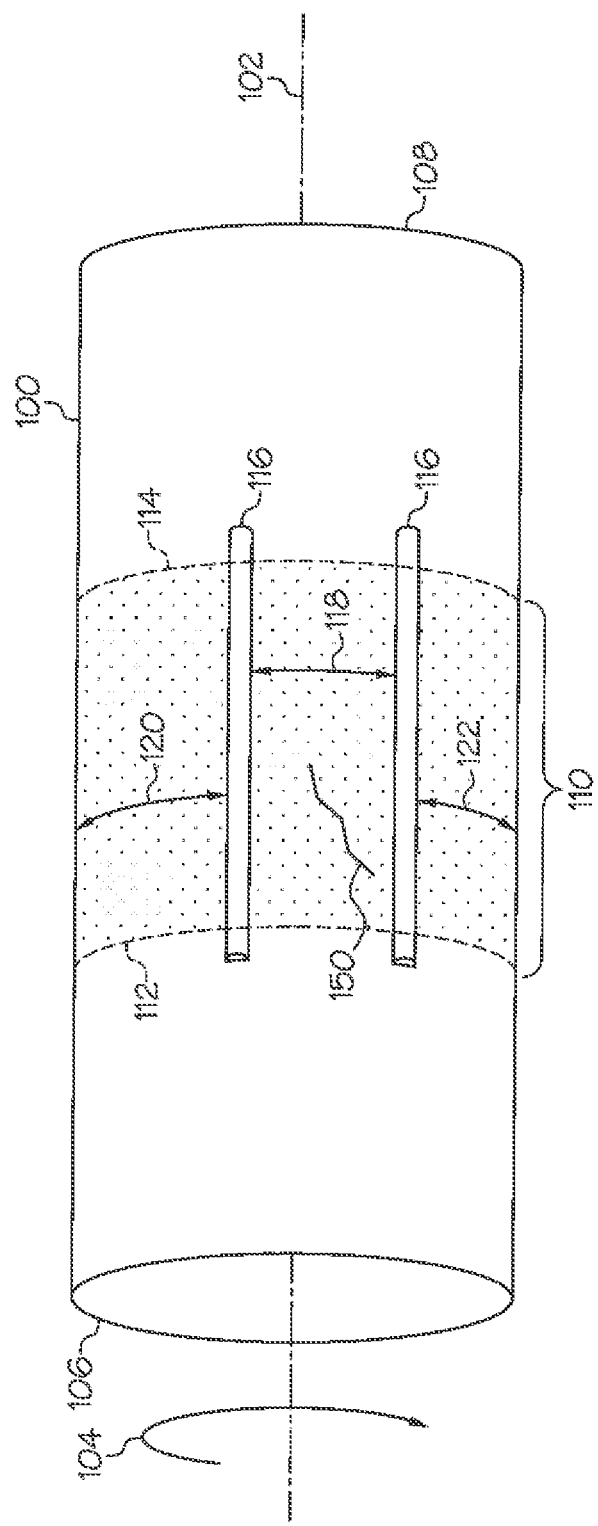
FIG. 1 is a perspective schematic view of a typical composite structure, in accordance with an exemplary embodiment.

FIG. 1 is a perspective schematic view of a typical composite structure 100, in accordance with an exemplary embodiment. Composite structure 100 is cylindrical around axis 102, having a forward side 106 and an aft side 108. The composite structure 100 is comprised of composite fibers, with a first fiber axis 104 that is substantially tangential around a circumference of the composite structure 100.

A reinforcement region 110, defined as a region in the composite structure 100 that needs to be strengthened, is determined. The reinforcement region 110 is anticipated to be (i) vulnerable to punctures and damage, such as damage 150, and (ii) vulnerable to propagation of any damage therein. In the embodiment, reinforcement region 110 is substantially a circumferential band that continues circumferentially around the cylindrical composite structure 100, however, reinforcement region 110 may be anywhere on the composite structure 100, and may have any shape or size. The novel concept presented herein provides a method and system for strengthening the reinforcement region 110; specifically, by locally strengthening an area within the reinforcement region, in order to direct loads away from weak areas of the composite structure 100.

In order to provide local strengthening within the reinforcement region 110, one or more load distribution devices (LDDs) 116 are disposed axially therein. The provided embodiments employ composite fiber LDDs 116 having at least one fiber (of the composite fibers of the LDD 116) with a second fiber axis that is oriented to be within a range of plus or minus 30 degrees from perpendicular to the first fiber axis of the composite structure 100. The size, material, and placement of the LDDs 116 reflect an application-specific design decision to locally strengthen (and direct load away from) a weak area 118, such as the area around the damage 150, within the reinforcement region 110. Once locally strengthened, an area that includes weak area 118 and the neighboring LDDs 116 may be referred to as a "dead zone" wherein damage propagation is inhibited and loads are directed away. A person with skill in the art will appreciate a weight tradeoff associated with the size, material, and number of LDDs 116 employed. It is contemplated that no more than 50% of the reinforcement region is covered with LDDs 116. For example, in FIG. 1, area 118 plus area 120 plus area 122 comprise a visible portion of reinforcement region 110 that is not covered by LDDs 116.

The combination of the orientation of the second fiber axis with respect to the first fiber axis 104 and the size and placement of the LDDs 116, provides several key advantages. One advantage offered by this combination is the ability to target and strengthen only discrete areas within reinforcement region 110, leaving the remaining areas within reinforcement region 110 (as well as the composite structure 100) thinner, and thereby optimizing the weight tradeoff (described above) for a given composite structure 100. Another advantage of the combination is the ability to inhibit circumferential damage propagation within reinforcement region 110, as damage can only propagate to the next neighboring LDD 116, before being inhibited.

Figure 2:
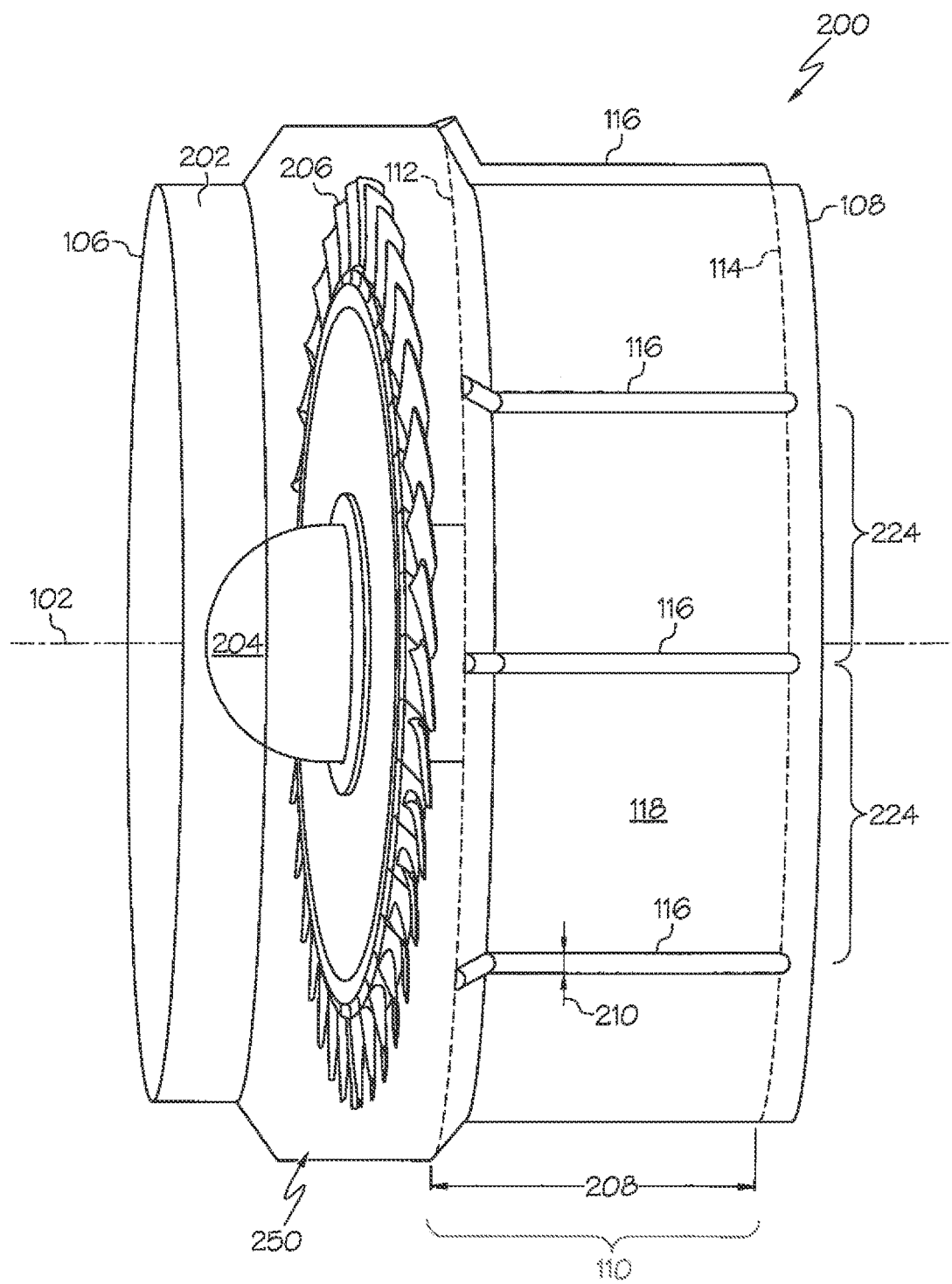
FIG. 2 is a perspective schematic view of a fan casing surrounding a fan, in accordance with an exemplary embodiment.

FIG. 2 is a perspective schematic view of a fan case 200 surrounding a fan 204, in accordance with an exemplary embodiment. Fan case 200 is an application-specific example of an improved composite structure employing LDDs 116. In aircraft design, an aircraft may have multiple turbine engines, each having at least one fan case 200.

Fan case 200 comprises a cylindrical casing 202 that is coaxial with and surrounds a fan 204 coupled to one or more LDDs 116. The cylindrical casing 202 has a forward end 106 and an aft end 108. As shown and described in FIG. 1, the cylindrical casing 202 comprises composite fibers such that a first fiber of the composite fibers has a first fiber axis (104, FIG. 1) oriented tangentially around the cylindrical casing 202. Fan 204 comprises a plurality of fan blades 206 that rotate around axis 102. A fan blade-out event, as described above, may cause damage such as punctures, cracks or dents to the fan case 200.

Within fan case 200, reinforcement region 110 is determined. Reinforcement region 110 may be arbitrarily determined, arrived at by structural analysis, arrived at experimentally, or it may be determined to be associated with a physical feature of the cylindrical casing 202, such as a fan containment housing 250. In the embodiment shown in FIG. 2, the novel concept presented herein provides a method and system for strengthening a reinforcement region 110 that is aft of the fan containment housing 250.

In the embodiment of FIG. 2, fan case 200 comprises a plurality of load distribution devices (LDDs) 116. Each LDD 116 of the plurality of LDDs 116 is disposed axially within reinforcement region 110, and each LDD 116 comprises composite fibers and is disposed along the reinforcement region such that (i) a fiber of the composite fibers of each LDD 116 has a second fiber axis that is oriented to be within a range of plus or minus 30 degrees from perpendicular to the first fiber axis (104, FIG. 1) of the cylindrical casing 202. As described above, the size, material, and placement/location of the LDDs 116 reflect an application-specific design decision to locally strengthen and direct load away from a weak area 118. The composite fibers employed in various embodiments may or may not be braided, and the composite fibers of the cylindrical casing 202 may or may not be the same as the composite fibers of the plurality of LDDs 116.

The embodiment of FIG. 2 depicts each of the LDDs 116 arranged around the circumference of the cylindrical casing 202 such that any space 224 between any LDD 116 and a neighboring LDD 116 is substantially equal to any other space 224 (it is to be noted that each space 224, which is comprised of weak area 118 and at least a portion of respective neighboring LDDs 116, functions as a dead zone, as described above). Each of the LDDs 116 may be coupled to the cylindrical casing 202 using any currently available technique, such as, with an adhesive, and/or may be interleaved into the fibers of the cylindrical casing 202.

The LDDs 116 are localized composite layers that locally strengthen and direct load away from weak areas 118, in the cylindrical casing 202 by acting like a bridge. Each of the LDDs 116 may have a predetermined width 210 and a predetermined length 208 that are optimized to reflect an application-specific design decision. In an embodiment, the predetermined length 208 is substantially nine times the predetermined width 210. LDD 116 placement and orientation may further prevent or inhibit growth and propagation of induced damage. A person with experience in the art will readily appreciate that design optimization entails balancing the strengthening provided by the number of LDDs 116 employed against the weight and mass added by the number of LDDs 116 employed. Accordingly, it is contemplated that optimal designs have less than 50% of the reinforcement region 110 covered by LDDs 116.

Thus, an improved composite structure and method for making same has been provided. The provided improved composite structure has locally strengthened areas within a reinforcement region. The locally strengthened areas within the reinforcement region have load distribution devices to redistribute load in order to (i) locally strengthen an area around damage induced by an initial momentary and direct transmitted load, and (ii) limit growth and propagation of damage induced by an initial momentary and direct transmitted load during a subsequent unbalance load. The improved composite structure reduces the impact of the fan blade out phenomenon in a weight efficient manner.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method of manufacturing a fan case for a turbine engine, comprising:
    fabricating a cylindrical casing comprising composite fibers such that a first fiber of the composite fibers has a first fiber axis oriented tangentially around the cylindrical casing, the cylindrical casing having a forward end, an aft end, and an axis;
    determining an area on the cylindrical casing to be a reinforcement region, wherein the reinforcement region begins and ends aft of a fan containment housing;
    disposing, within the reinforcement region, a plurality of load distribution devices (LDDs) that comprise composite fibers, the LDDs arranged axially within the reinforcement region such that, (i) for each LDD, a fiber of the composite fibers of the LDD has a fiber axis that is oriented to be within a range of plus or minus 30 degrees from perpendicular to the first fiber axis of the cylindrical casing, (ii) the plurality of LDDs does not cover more than 50% of the reinforcement region, (iii) each LDD of the plurality of LDDs is separated from each of its respective neighbor LDDs by a space, and (iv) the spaces between the LDDs are substantially equal.

2. The method of claim 1, further comprising: coupling the plurality of LDDs to the cylindrical casing.

3. The method of claim 2, wherein coupling the plurality of LDDs to the cylindrical casing comprises interleaving the plurality of LDDs within the composite fibers of the cylindrical casing.

4. The method of claim 2, wherein coupling the plurality of LDDs to the cylindrical casing comprises applying an adhesive.

5. The method of claim 3, wherein each of the plurality of LDDs comprises a predetermined width and a predetermined length, and wherein the predetermined length is about nine times the predetermined width.

6. The method of claim 2, wherein the composite fibers of the LDD and the composite fibers of the cylindrical casing are the same.

7. The method of claim 1, wherein, for each of the LDDs, the composite fibers of the LDD are braided.

8. A fan case assembly, comprising:
    a cylindrical casing comprising composite fibers such that a first fiber of the composite fibers has a first fiber axis oriented tangentially around a circumference of the cylindrical casing, the cylindrical casing having a forward end, an aft end, an axis, a fan containment housing, and a region aft of the fan containment housing defined as a reinforcement region, wherein the reinforcement region begins and ends aft of the fan containment housing; and
    a plurality of load distribution devices (LDDs) comprising composite fibers coupled to the reinforcement region, the LDDs disposed along the reinforcement region such that (i) for each LDD of the plurality of LDDs, a fiber of the composite fibers of the LDD has a fiber axis that is oriented to be within a range of plus or minus 30 degrees from perpendicular to the first fiber axis of the cylindrical casing, and (ii) the plurality of LDDs do not cover more than 50% of the reinforcement region, (iii) each LDD of the plurality of LDDs is separated from each of its respective neighbor LDDs by a space, and (iv) each of the spaces are substantially equal.

9. The fan case assembly of claim 8, wherein the plurality of LDDs are coupled to the reinforcement region of the cylindrical casing by being interleaved into the composite fibers of the cylindrical casing.

10. The fan case assembly of claim 8, wherein the plurality of LDDs are coupled to the cylindrical casing by applying an adhesive.

11. The fan case assembly of claim 8, wherein the composite fibers of the LDD and the composite fibers of the cylindrical casing are the same.

12. The fan case assembly of claim 8, wherein, for each of the LDDs, the composite fibers of the LDD are braided.

13. A method of manufacturing a composite structure, comprising:

fabricating a cylindrical casing comprising composite fibers such that a first fiber of the composite fibers has a first fiber axis oriented tangentially around the cylindrical casing, the cylindrical casing having a forward end, an aft end, and an axis;

determining an area on the cylindrical casing to be a reinforcement region, wherein the reinforcement region begins and ends aft of a fan containment housing;

interleaving into the reinforcement region a plurality of load distribution devices (LDDs) that comprise composite fibers such that, (i) each of the plurality of LDDs are substantially parallel to each other, and each are oriented to be within a range of plus or minus 30 degrees from perpendicular to the first fiber axis of the cylindrical casing, (ii) the plurality of LDDs do not cover more than 50% of the reinforcement region, (iii) each LDD of the plurality of LDDs is separated from each of its respective neighbor LDDs by a space, and (iv) each of the spaces are substantially equal.

14. The method of claim 13, wherein each of the plurality of LDDs comprises a predetermined width and a predetermined length, and wherein the predetermined length is about nine times the predetermined width.

15. The method of claim 13, wherein, for each of the LDDs, the composite fibers of the LDD are braided.

* * * * *